United States Patent
Thakur et al.

(10) Patent No.: US 12,147,309 B2
(45) Date of Patent: Nov. 19, 2024

(54) SYSTEM AND METHOD FOR EVENT JOURNAL DELIVERY

(71) Applicant: Druva Inc., Sunnyvale, CA (US)

(72) Inventors: Pallavi Thakur, Pune (IN); Somesh Jain, Pune (IN); Milind Vithal Borate, Pune (IN); Prahlad Nishal, Pune (IN)

(73) Assignee: Druva Inc., Santa Clara, CA (US)

( * ) Notice: Subject to any disclaimer, the term of this patent is extended or adjusted under 35 U.S.C. 154(b) by 86 days.

(21) Appl. No.: 17/120,565

(22) Filed: Dec. 14, 2020

(65) Prior Publication Data
US 2021/0271566 A1    Sep. 2, 2021

(30) Foreign Application Priority Data

Feb. 29, 2020   (IN) .............................. 202041008701

(51) Int. Cl.
G06F 11/14    (2006.01)
G06F 9/50     (2006.01)
G06F 16/18    (2019.01)

(52) U.S. Cl.
CPC .......... *G06F 11/1464* (2013.01); *G06F 9/505* (2013.01); *G06F 11/1451* (2013.01); *G06F 11/1461* (2013.01); *G06F 11/1469* (2013.01); *G06F 16/1815* (2019.01); *G06F 2201/80* (2013.01); *G06F 2201/84* (2013.01)

(58) Field of Classification Search
CPC .. G06F 11/1464; G06F 16/1815; G06F 9/505; G06F 11/1451; G06F 11/1461; G06F 11/1469; G06F 2201/80; G06F 2201/84
See application file for complete search history.

(56) References Cited

U.S. PATENT DOCUMENTS

| | | | |
|---|---|---|---|
| 7,519,870 B1* | 4/2009 | Sim-Tang ........... | G06F 11/1471 714/48 |
| 2008/0010641 A1* | 1/2008 | Zhao ...................... | G06F 9/542 718/101 |
| 2009/0049329 A1* | 2/2009 | Lind .................... | G06F 11/2097 714/2 |
| 2014/0328573 A1* | 11/2014 | Abhijeet ................ | H04L 9/085 386/263 |
| 2015/0254298 A1* | 9/2015 | Bourbonnais ......... | G06F 16/273 707/610 |
| 2016/0142343 A1* | 5/2016 | Tongle ................... | H04L 69/22 370/474 |
| 2017/0124104 A1* | 5/2017 | Smith ................... | G06F 16/148 |
| 2018/0276256 A1* | 9/2018 | Sarkar ................. | G06F 18/2321 |
| 2020/0379774 A1* | 12/2020 | Alperovich ......... | G06F 12/0804 |

\* cited by examiner

*Primary Examiner* — Mark D Featherstone
*Assistant Examiner* — Tony Wu
(74) *Attorney, Agent, or Firm* — IceMiller LLP

(57) ABSTRACT

System for delivering an event journal during a back-up session in a distributed file system is presented. The system includes an event intake module, a load balancer, a plurality of object creation modules, a journal manager, and a journal service module. Each object creation module of the plurality of object creation modules further includes an ingestor and a drainer. A related method is also presented. The system and method provide for reliable and time-ordered delivery of events in the event journal.

20 Claims, 7 Drawing Sheets

SYSTEM AND METHOD FOR EVENT JOURNAL DELIVERY

PRIORITY STATEMENT

The present application claims priority under 35 U.S.C. § 119 to Indian patent application Ser. No. 202041008701 filed 29 Feb. 2020, the entire contents of which are hereby incorporated herein by reference.

BACKGROUND

Embodiments of the present invention generally relate to systems and methods for delivering an event journal during a back-up session, and more particularly to systems and methods for delivering an event journal during a back-up session in a distributed file system.

For a distributed versioned file system used for enterprise backup, an event journal is maintained to serve different customer use cases. The consumer of the event journal may require that all the events generated during a given back-up session of a given back-up dataset are presented in the event journal. Further, it may be desirable that the event journal includes events in time order of creation.

However, in a distributed file system, these events are generated at different nodes of the distributed file system and travel through multiple semi-persistent queues/streams before they are persisted on storage. Hence, there is no guarantee that they are delivered in the same time order of creation. Moreover, guaranteeing that all events generated during a backup session are available in an event journal may also be a challenge.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a system for delivering an event journal during a back-up session in a distributed file system is presented. The system includes an event intake module configured to receive a plurality of events from a plurality of back-up sessions corresponding to a plurality of back-up data sets. The system further includes a load balancer configured to selectively distribute the plurality of events to create at least one event queue. The system furthermore includes a plurality of object creation modules configured to receive the plurality of events distributed by the load balancer. Each object creation module includes an ingestor unit configured to add a creation time-stamp to each event of the plurality of events being ingested, and a drainer unit configured to process a set of ingested events, from the corresponding event queue, to create a plurality of objects that are stored in an object storage, and to record the latest processing time-stamps of the ingested events being stored in the object storage. Moreover, the system includes a journal manager configured to create an event journal for each back-up set of the plurality of back-up sets by extracting the ingested events from the plurality of objects for which the creation time-stamp is before a drain time-stamp, wherein the drain time-stamp is the smallest of the processing time-stamps recorded by each of the active drainers. The journal manager is further configured to record an extraction time-stamp as a last-processed drain time-stamp. The system further includes a journal service module configured to deliver an event journal corresponding to a particular back-up session of a particular back-up data set, in response to a query, if an end time-stamp of the particular back-up session is before the extraction time-stamp.

According to another example embodiment, a system for delivering an event journal generated during a back-up session in a distributed file system is presented. The system includes a memory storing one or more processor-executable routines and a processor communicatively coupled to the memory. The processor is configured to receive a plurality of events from a plurality of back-up sessions corresponding to a plurality of back-up data sets. The processor is further configured to selectively distribute the plurality of events across a plurality of object creation modules to create at least one event queue, each object creation module of the plurality of object creation modules comprising an ingestor unit and a drainer unit. The processor is furthermore configured to add a creation time-stamp, by the corresponding ingestor units, to each event of the plurality of events being ingested. Moreover, the processor is configured to process the plurality of ingested events, by the corresponding drainer units, to create a plurality of objects that are stored in an object storage, and record the latest processing time-stamps of the ingested events being stored in the object storage, by each of the active drainer units. The processor is also configured to create an event journal for each back-up set of the plurality of back-up sets by extracting the ingested events from the plurality of objects for which the creation time-stamp is before a drain time-stamp, wherein the drain time-stamp is the smallest of the processing time-stamps recorded by each of the active drainer units. The processor is further configured to record an extraction time-stamp as a last-processed drain time-stamp. The processor is furthermore configured to deliver an event journal corresponding to a particular back-up session of a particular back-up data set, in response to a query, if an end time-stamp of the particular back-up session is before the extraction time-stamp.

According to another example embodiment, a method for delivering an event journal generated during a back-up session in a distributed file system is presented. The method includes receiving a plurality of events from a plurality of back-up sessions corresponding to a plurality of back-up data sets, and selectively distributing the plurality of events across a plurality of object creation modules to create an event queue. Each object creation module of the plurality of object creation modules includes an ingestor unit and a drainer unit. The method further includes adding a creation time-stamp, by the corresponding ingestor units, to each event of the plurality of events being ingested. The method furthermore includes processing the plurality of ingested events from the event queue, by the corresponding drainer units, to create a plurality of objects that are stored in an object storage. The method further includes recording the latest processing time-stamps of the ingested events being stored in the object storage, by each of the active drainer units. The method further includes creating an event journal for each back-up set of the plurality of back-up sets by extracting the ingested events from the plurality of objects for which the creation time-stamp is before a drain time-stamp, wherein the drain time-stamp is the smallest of the processing time-stamps recorded by each of the active drainer units. The method furthermore includes recording an extraction time-stamp as a last-processed drain time-stamp. Moreover, the method includes delivering an event journal corresponding to a particular back-up session of a particular back-up data set, in response to a query, if an end time-stamp of the particular back-up session is before the extraction time-stamp.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
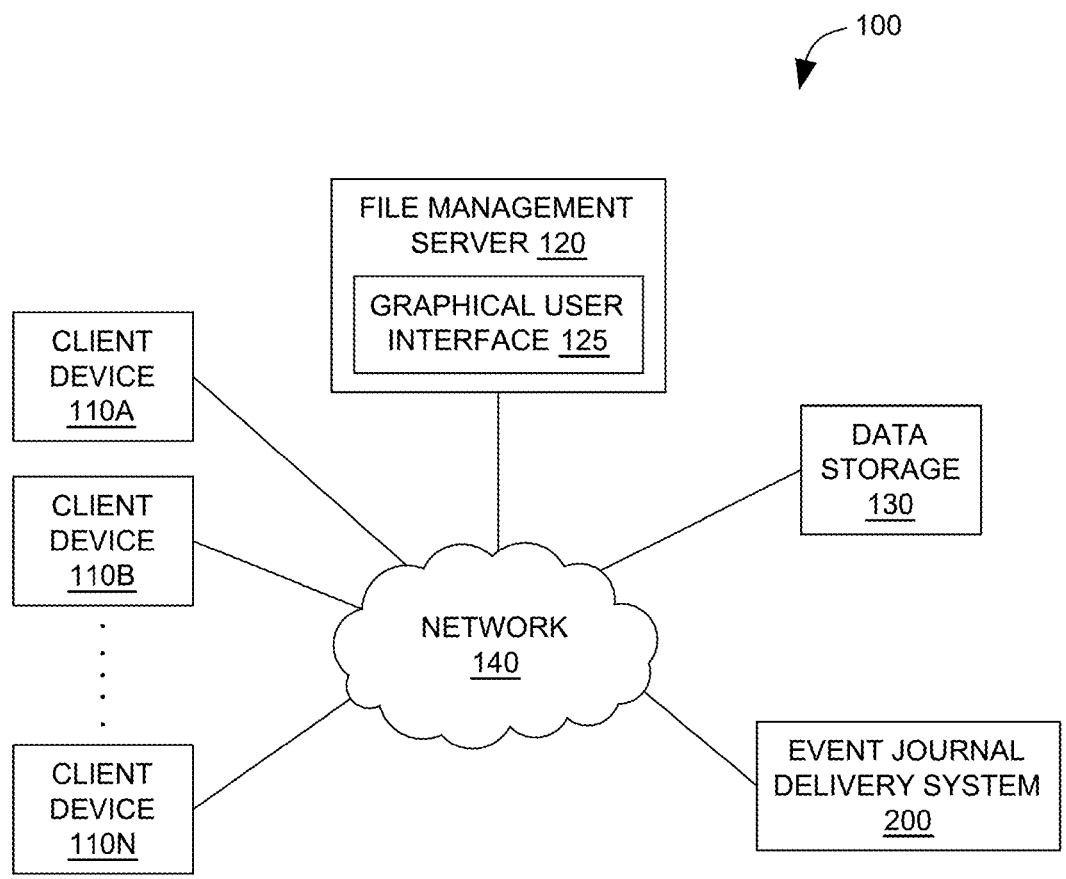
FIG. 1 is a block diagram illustrating an example data back-up system environment, according to some aspects of the present description.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present description provide systems and methods for delivering an event journal during a back-up session in a distributed file system. Some embodiments of the present description provide systems and methods for stable and reliable delivery of an event journal, such that all the events generated for the back-up session are delivered in a time-ordered manner.

FIG. 1 illustrates an example data back-up system environment 100, in accordance with some embodiments of the present description. The system environment 100 includes a plurality of client devices 110 (110A, 110B . . . 110N), a file management server 120, a data storage 130, and an event journal delivery system 200. The system environment 100 may be configured to store back-up data sets from the plurality of client devices 110 in the data storage 130 using the file management server 120. In some embodiments, a client device such as 110A, 110B . . . 110N may send a request to read, search, add, delete, or modify data sets stored on a cloud environment via a front-end graphical user interface 125 provided and operated by the file management server 120, or, via other suitable ways such as application program interfaces (APIs). Examples of data in the back-up data sets stored include, but are not limited to, a text file, an image file, an audio clip, a video clip, an email, or any combination thereof.

The plurality of client devices 110 may be any computing devices that have data that may need back-up. Examples of such client devices 110 include personal computers (PC), desktop computers, laptop computers, tablets, smartphones, IoT devices, wearable electronic devices such as smart watches, or any other suitable electronic devices. The plurality of client devices 110 also may be server-type devices that may need back-up, such as web servers, file servers, database servers, etc. Moreover, in some embodiments, the clients may be heterogeneous. For example, the clients may be of different types, such as individual end-users, organizations, businesses, webpage providers, servers, and the like. Although clients may be heterogeneous, from the point of view of the file management server 120, the plurality of client devices 110 that may need data back-up services may be treated in the same or a similar manner.

In some embodiments, the data back-up system environment 100 is configured to service a plurality of client devices 110 in an enterprise setup across different locations (e.g., countries, cities, office spaces, etc.) in a particular region. Furthermore, in some embodiments, the data back-up system environment 100 is configured to back-up data sets in a distributed versioned file system. As used herein, the term "distributed file system" refers to a distributed, often decentralized, system that distributes data among different nodes to provide better data access and operation in case of a failure or offline of one or more nodes. Example distributed versioned file systems include Amazon S3, RedHat Ceph, Lustre, and GlusterFS.

The file management server 120 may be a software or a hardware component that enables the plurality of client devices 110 to store and back-up data and search and access the back-up data. The file management server 120 may provide graphical user interface 125 for individual clients to access server 120 for cloud data management. For example, a graphical user interface 125 may be a front-end cloud storage interface. Additionally, or alternatively, the file management server 120 may provide APIs for the access and management of files from the client devices 110.

The file management server 120 may also manage, coordinate, and communicate with other system components such as the data storage 130 and the event journal delivery system 200. In some embodiments, the data storage 130 is a cloud-based storage. The back-up data sets from the plurality of client devices 110 may be stored and backed-up in an object-based storage, a file-based storage, or a block-based storage. In some embodiments, the back-up data set is stored in an object-based storage. Non-limiting examples of suitable data storage 120 include AMAZON S3, RACKSPACE CLOUD FILES, AZURE BLOB STORAGE, and GOOGLE CLOUD STORAGE. The file management server 120 also may manage, coordinate, and communicate with the event journal delivery system 200 via the journal service delivery module 250, as described in detail later.

The various components in the system environment 100 may communicate through the network 105 and/or locally. For example, in some embodiments, one of the system components may communicate locally with the file management server 120, while other components communicate with the file management server 120 through the networks. In other embodiments, every component in the system environment 100 is online and communicates with each other through the network 140. In one embodiment, the network 140 uses standard communications technologies and/or protocols. Thus, the network 140 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 105 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

While the file management server 120, the data storage 130, and the event journal delivery system 200 are each represented by a single block in FIG. 1, each of these components may include multiple distributed and/or independent computers (may also be referred to as workers) working cooperatively and in parallel with other computers so that the operation of the entire system will not be affected when one or more workers are down.

Figure 2:
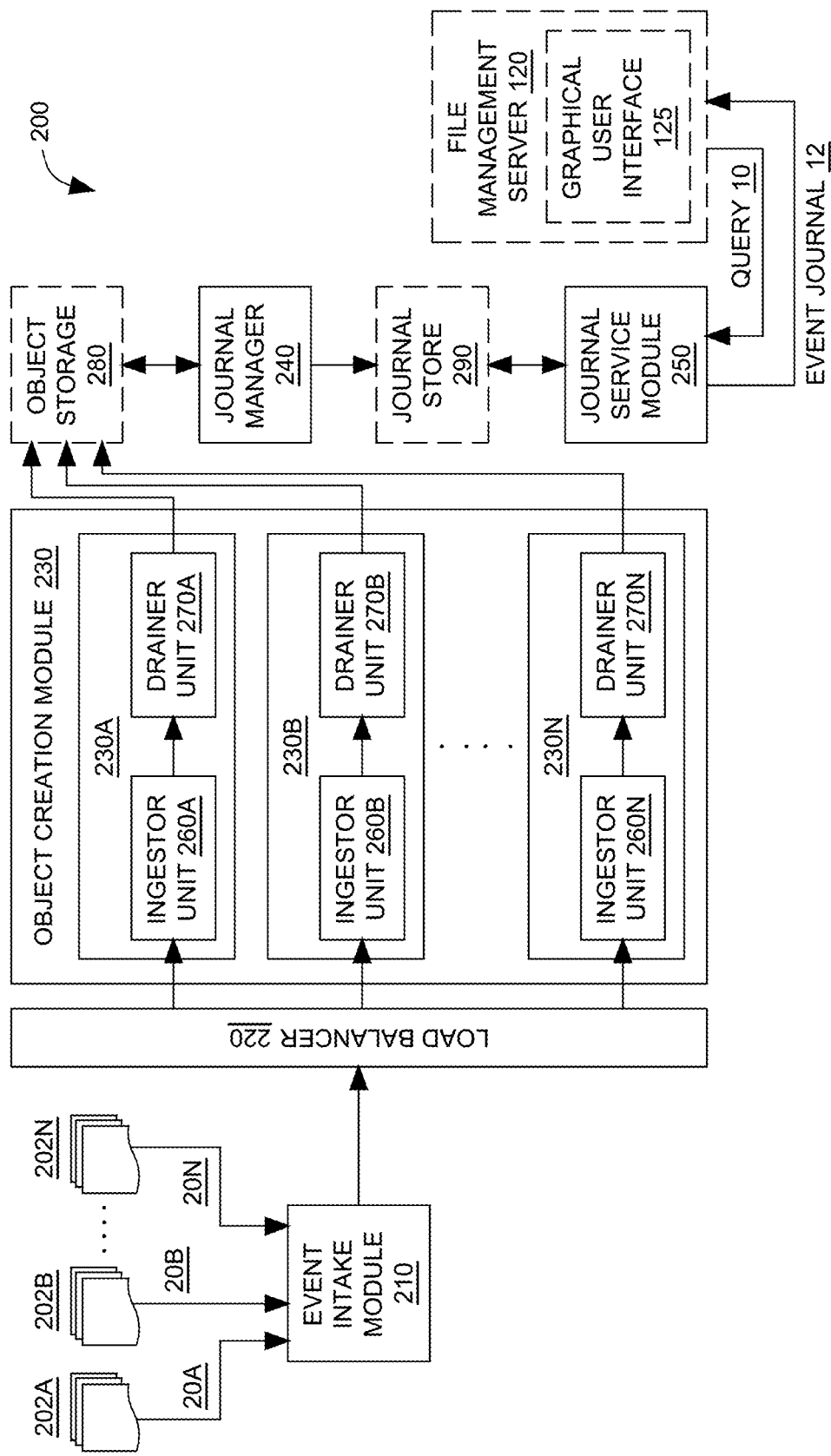
FIG. 2 is a block diagram illustrating an example system for delivering an event journal, according to some aspects of the present description.

FIG. 2 is a block diagram of an event journal delivery system 200, in accordance with some embodiments of the present description. The system 200 includes an event intake module 210, a load balancer 220, a plurality of object creation modules 230, a journal manager 240, and a journal service module 250. Each object creation module 230A, 230B . . . 230N of the plurality of object creation modules 230 further includes an ingestor unit 260A, 260B . . . 260N and a drainer unit 270A, 270B . . . 270N. As illustrated in FIG. 2, the system 200 may optionally further include the object storage 280 and the journal store 290. These system components are described in further detail below.

The event intake module 210 is configured to receive a plurality of events from a plurality of back-up sessions corresponding to a plurality of back-up data sets. The term "event" as used herein refers to data generated for a particular back-up session of a particular back-up data set. An event corresponding to a particular back-up session may include details of the back-up session (e.g., start time, end time, number of files backed-up, location details of the data-backed up, etc.), any action taken on the stored data (e.g., access details, type of action taken, e.g., file deletion, file creation, folder deletion, folder addition etc.), details of the data itself e.g., metadata of the data in the back-up data set, and metadata for the event itself. Non-limiting examples of file metadata may include file version, file name, creation version, deletion version, modification time, size, etc. For an email, the metadata may be different from a regular file. Non-limiting examples of email metadata may include sender, recipient, subject line, copy list, etc.

Each event of the plurality of events may be assigned a unique sequence number as each event is generated and sent to the load balancer 220. The sequence number is unique within a given back-up session and indicates the order in which the events are generated during a particular back-up session. Further, such unique sequence numbers are monotonically assigned to the events of a back-up session. In some embodiments, multiple workers may contribute to a single back-up session of a given back-up set. In such embodiments, each worker may be allocated a unique range of sequence numbers on-demand. The event metadata may include the unique sequence number assigned to it, a back-up set identifier, and a back-up session identifier (or a snapshot version number).

The plurality of back-up data sets may be from a single client or from different clients being serviced by the data back-up system environment 100 such as shown in FIG. 1. Further, the plurality of back-up data sets may be from a single client device or a plurality of client devices. As noted earlier with reference to FIG. 1, the client devices may be any computing devices that have data that may need back-up. In some embodiments, the plurality of back-up data sets includes enterprise-level data from a plurality of client devices 110 in a particular region but distributed across different locations (e.g., countries, cities, office spaces, etc.).

A plurality of events corresponding to a plurality of back-up sessions of a plurality of back-up data sets may be received by the event intake module 210, in accordance with some embodiments of the present description. This is illustrated in FIG. 2, where events 20A, 20B . . . 20N corresponding to back-up sessions 202A, 202B . . . 202N are received by the event intake module 210. Each of the back-up session 202A, 202B . . . 202N corresponds to a different back-up data set. The plurality of events 20A, 20B . . . 20N may each include a single event corresponding to a particular back-up session, or, a stream of events corresponding to a particular back-up session.

The system 200 further includes a load balancer 220 communicatively coupled to the event intake module 210 and one or more object creation modules 230. The load balancer 220 is configured to selectively distribute the plurality of events 20A, 20B . . . 20N to create at least one event queue. As used herein the term "event queue" corresponds to a stream of events being processed by one of the object creation modules 230A, 230B . . . 230N of the plurality of object creation modules 230. A particular event queue may include a stream of events of the plurality of events in a random manner. For example, a first event queue may include events 20A, 20F, and 20L and a second event queue may include 20C, 20J, and 20K. The load balancer 220 may be configured to distribute the plurality of events 20A, 20B . . . 20N in a round-robin manner.

As shown in FIG. 2, the system further includes a plurality of object creation modules 230A, 230B . . . 230N, collectively denoted by reference numeral 230. An object creation module such as 230A, 230B . . . 230N is configured to process the stream of events in the event queue to create objects that can be stored in the object storage 280. The term "object" as used herein refers to un-partitioned objects that include events from different back-up sessions of different data sets.

Each object creation module 230A, 230B . . . 230N further includes an ingestor unit 260A, 260B . . . 260N, and a drainer unit 270A, 270B . . . 270N. Each ingestor unit is communicatively coupled to the load balancer 220 and a corresponding drainer unit. An "ingestor unit" is configured to receive the stream of events from the corresponding event queue from the load balancer 220 and write a stream of events to a semi-persistent queue. The ingestor unit 260A, 260B . . . 260N may be configured to ingest the events in real-time or in batches. In some embodiments, the ingestor unit 260A, 260B . . . 260N is configured to ingest the events in real-time and write a stream of events to a semi-persistent queue, e.g., an AWS Kinesis stream.

The ingestor unit 260A, 260B . . . 260N is further configured to add a creation time-stamp (CTS) to each event of the plurality of events being ingested. Since the creation time-stamp is generated by ingestor, the creation time-stamp order of events need not match the unique sequence number assigned to the events at the time of generation. The addition of the creation time-stamp by the ingestor unit is further illustrated in FIG. 4.

Each object creation module 230, 230B . . . 230N further includes a drainer unit 270A, 270B . . . 270N. Each drainer unit is communicatively coupled to a corresponding ingestor unit and an object storage 280. A "drainer unit" is configured to read a plurality of ingested events from the event queue and batch-process the plurality of events to create at least one object that is stored in the object storage 280. As noted earlier, the term "object" as used herein refers to un-partitioned objects that include events from different back-up sessions of different data sets.

The object storage 280 stores data in the object format in, for example, non-volatile memory. Object storage (also known as object-based storage) is a computer data storage architecture that manages data as objects, as opposed to other storage architectures like file storage which manages data as a file hierarchy and block storage which manages data as blocks within sectors and tracks. Each object typically may include the data of the object itself, a variable amount of metadata of the object, and a unique identifier that identifies the object. Non-limited examples of suitable object storages include AMAZON S3, RACKSPACE CLOUD FILES, AZURE BLOB STORAGE, and GOOGLE CLOUD STORAGE.

Each active drainer unit 270A, 270B . . . 270N is configured to process a set of ingested events by the corresponding ingestor 260A, 260B . . . 260N, as shown in FIG. 2. Further, each active drainer unit 270A, 270B . . . 270N is configured to process a set of ingested events from the corresponding event queue, to create a plurality of objects that are stored in the object storage 280.

Each active drainer unit 270A, 270B . . . 270N is further configured to record the latest processing time-stamp (PTS) of the ingested events being processed and stored as objects in the object storage. 280. The latest processing time-stamp (PTS) for each active drainer refers to the latest creation time-stamp in the stream of ingested events processed and stored most recently as an object. The latest processing time-stamp (PTS) for each active drainer may be recorded in a suitable database (not shown in FIG.s). The active drainer units maintain and update the latest processing time-stamp (PTS) in this database. The recordation of the processing time-stamp by the drainer unit is further illustrated in FIG. 4.

Figure 3:
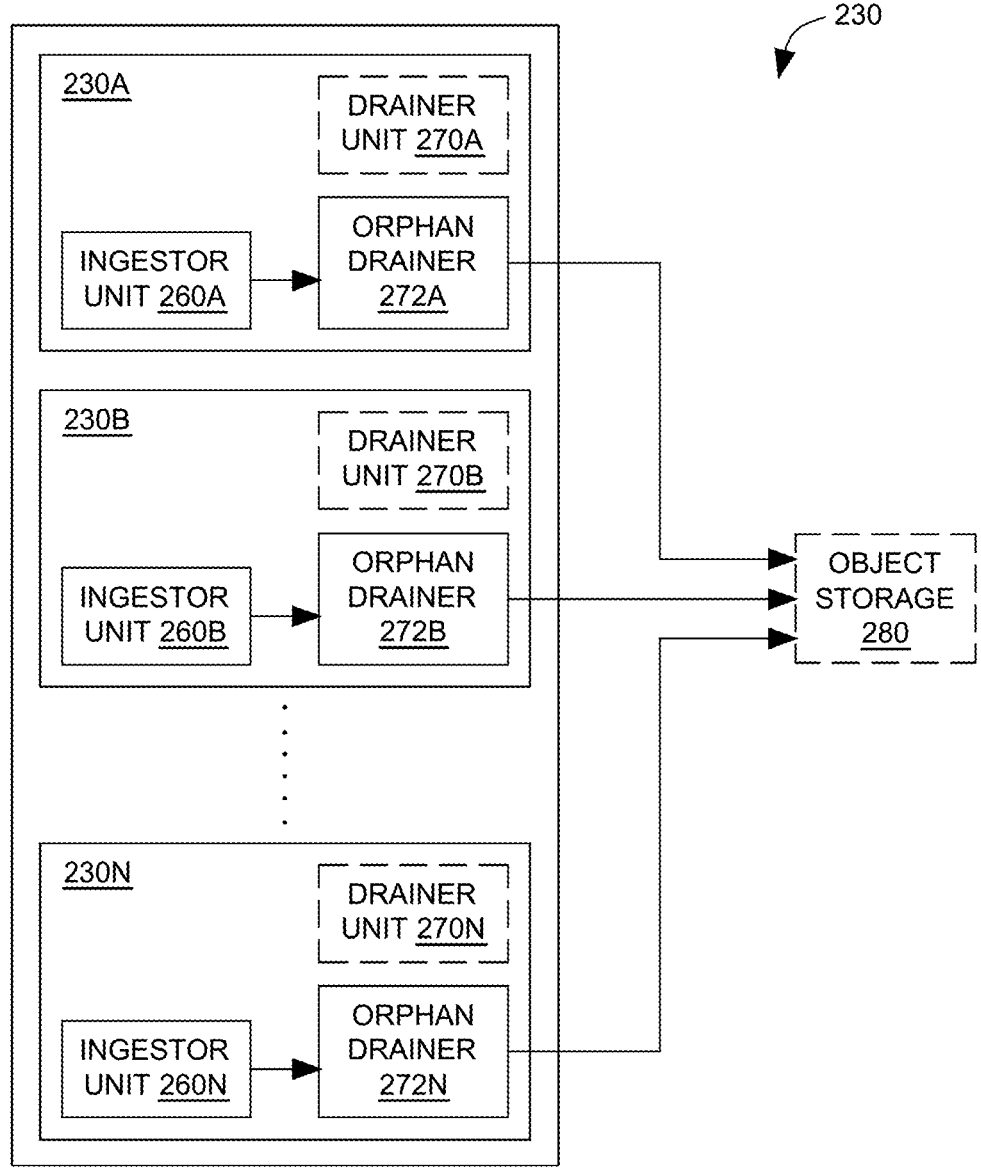
FIG. 3 is a block diagram illustrating an example object creation module, according to some aspects of the present description.

In some instances, the system 200 may undergo a sudden scale-down in which one or more object creation modules may shutdown. In this scenario, events added by the ingestor unit to the queue in the shutdown units may need to be batched and stored. In such embodiments, as shown in FIG. 3 each object creation module 230A, 230B . . . 230N further includes an orphan drainer unit such as represented by reference numerals 272A, 272B . . . 272N. The "orphan drainer" is configured to process a set of ingested events, from the corresponding event queue, to create a plurality of objects that are stored in the object storage 280, if a corresponding object creation module shuts down.

Referring again to FIG. 2, the system 200 further includes a journal manager 240. The journal manager 240 is communicatively coupled to the object storage 280 and a journal store 290. In some embodiments, the journal manager 240 is configured to periodically perform ETL (Extract, Transform and Load) functions on the un-partitioned objects created and stored by the drainer units in the object storage 280.

The journal manager 240 is configured to create an event journal for each back-up set of the plurality of back-up sets by extracting the events from the plurality of objects and partitioning the events to form partitioned objects. The term "event journal" as used herein refers to a partitioned object which contains events generated within a certain time frame (time between two consecutive ETL functions by the journal manager 240) corresponding to a single back-up data set. The journal manager 240 may periodically read and sort the events in the objects stored in the object storage 280 to create an event journal corresponding to each back-up dataset.

The journal manager 240 is further communicatively coupled to the database in which the drainer units record the processing time-stamps (PTS). The journal manager 240 is configured to read a drain time-stamp (DTS) from the database, where the drain time-stamp (DTS) is the smallest of the processing time-stamps (PTS) recorded by each of the active drainers. According to embodiments of the description, the journal manager is configured to extract and process only those ingested events from the object store 280 for which the creation time-stamp (CTS) is before the drain time-stamp (DTS). In some embodiments, the journal manager 240 gets a list of objects added in the object store 280 since the last run that have CTS smaller than DTS, and extracts and processes the events in these objects to create event journals that are stored in the journal store 290.

Figure 4:
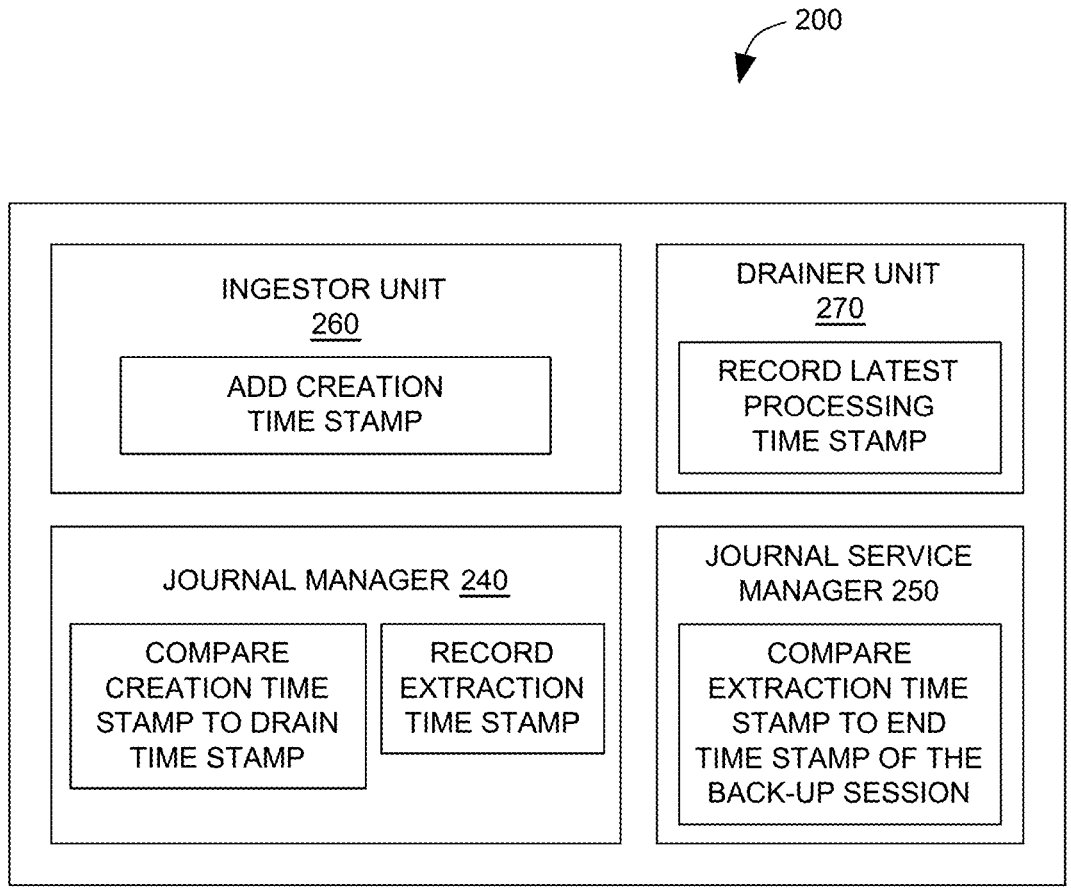
FIG. 4 is a block diagram illustrating an example system for delivering an event journal, according to some aspects of the present description.

The journal manager is further configured to record an extraction time-stamp (ETS) as a last-processed drain time-stamp (DTS). This ensures that all events generated before ETS are available in the event journals stored in the journal store 290. In some embodiments, the journal manager may be further configured to adjust the extraction time-stamp (ETS) for a jitter time. FIG. 4 further illustrates the comparison of the creation time-stamp with the drain time-stamp, and recordation of an extraction time-stamp as performed by the journal manager 240.

Referring again to FIG. 2, the system further includes a journal service module 250 communicatively coupled with the journal store 290 and the file management server 120. The journal service module 250 may be accessed by a client via a graphical user interface in the journal service module 250 (not shown in FIG.s) or via the file management server 120, as shown in FIG. 2. Additionally, or alternatively, journals service module 250 may provide APIs for the access of events journals from the journal store 290. The file management server 120 may provide graphical user interface 125 for individual clients to access the journal service module 250. Additionally, or alternatively, the file management server 120 may provide APIs for the access of events journals from the journal store 290 via the journal service module 250.

The journal service module 250 is configured to deliver an event journal 12 corresponding to a particular back-up session of a particular back-up data set, in response to a query 10, if an end time-stamp of the particular back-up session is before the extraction time-stamp (ETS). The query 10 may correspond to a metadata search, a compliance-related data search, a data anomaly detection search, a storage-analytics related search, a data-mining related search, or combinations thereof A query 10 to obtain an event journal corresponding to a particular back up session of a particular back-up set may be submitted by the client directly to the journal service module 250 or via the file management server 120. The query 10 includes the back-up data set identifier and the back-up session identifier for which an event journal is required. The query 10 further includes a start time-stamp and an end-time-stamp of the back-up session. The journal service module 250 is configured to retrieve an event journal corresponding to the particular back-up data set and the back-up session based on the back-up data set identifier and the back-up version identifier (or the snapshot version) stored in the event metadata.

Further, the journal service module 250 is configured to compare the end time-stamp of the back-up session, from the query 10, with the extraction time-stamp (ETS) recorded by the journal manager 240. The journal service module 250 is configured to only deliver an event journal 12 if the end time-stamp is before the extraction time-stamp. In instances where the end time-stamp of the particular back-up session is after the extraction time-stamp, some of the events generated during that back-up session may be missing from the extracted and processed data. In such instances, the journal service module is configured to return a command to try later.

As illustrated in FIG. 2, different events belonging to a given backup session of a back-up data set can pass through different ingestor units and may be written to different queues. Further, they may be drained by different drainer units and can belong to different objects in the object storage. Furthermore, the events may be processed and stored at different times depending on the varied speeds of different ingestor units and drainer units. Thus, it may be difficult to ensure that all events corresponding to a particular back-up session of a particular back-up data set are present in an event journal (queried in real-time during the processing of the events) as some of the events may have not been processed yet or may still be in transit. Embodiments of the present description address this problem by ensuring that the delivered event journal includes all the events generated during a back-up session.

In some embodiments, the journal service module 250 is further configured to sort the events in the order of assigned sequence numbers (from the event metadata) before delivering the event journal 12 corresponding to a particular back-up session of a particular back-up data set. Thus, embodiments of the present description provide for a reliable and stable delivery of an event journal that includes events in the same order as creation.

Embodiments of the present description may provide for delivery of an event journal in use cases such as a metadata search, a compliance-related data search, a data anomaly detection search, a storage-analytics related search, a data-mining related search, or combinations thereof.

Figure 5:
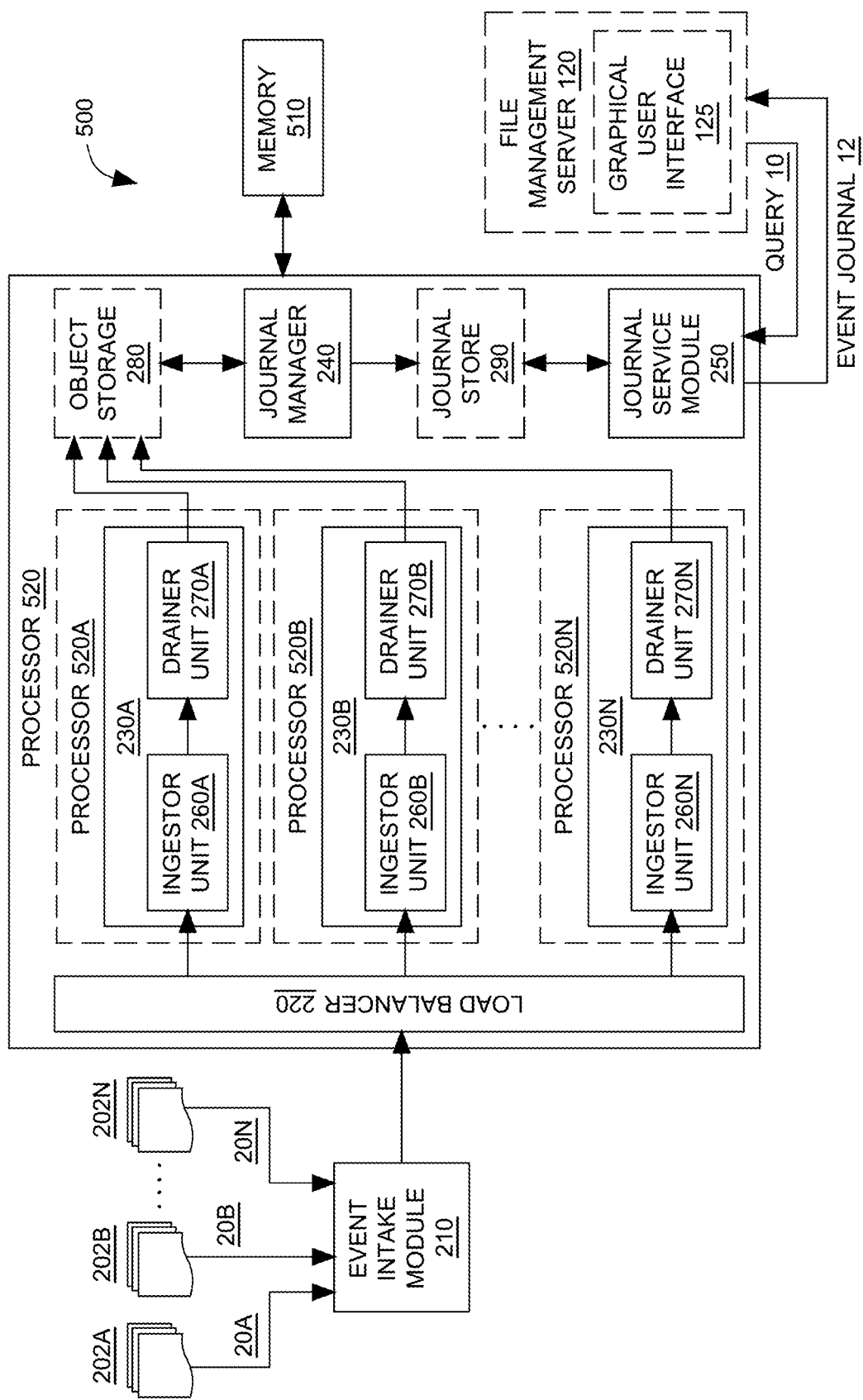
FIG. 5 is a block diagram illustrating an example system for delivering an event journal, according to some aspects of the present description.

Referring now to FIG. 5, a system 500, according to one embodiment, for delivering an event journal generated during a back-up session in a distributed file system is presented. The system 500 includes a memory 510 storing one or more processor-executable routines and a processor 520 communicatively coupled to the memory. The system optionally further includes an event intake module 210. The processor 520 further includes a load balancer 220, a plurality of object creation modules 230A, 230N, . . . 230N, a journal manager 240, and a journal service module 250. Each object creation module 230A, 230B . . . 230N further includes an ingestor unit 260A, 260B . . . 260N and a drainer unit 270A, 270B . . . 270N. As illustrated in FIG. 5, the processor 520 may optionally further include the object storage 280 and the journal store 290. Each of these components is described in detail earlier. The processor 520 is further configured to execute the processor-executable routines to perform the steps illustrated in the flow-chart of FIG. 6.

It should be noted that the present description encompasses embodiments including a single processor as well as multiple processors. According to one embodiment of the present description, the system 500 may include a plurality of processors (collectively referred to as 520), and each of these processors may include an ingester unit and a drainer unit. This embodiment is further illustrated in FIG. 5 where a plurality of processors 520A, 520B, . . . 520N are shown (by dashed lines), each processor including a corresponding ingestor unit 260A, 260B, . . . 260N and a drainer unit 270A, 270B . . . 270N. In such embodiments, each processor may be further communicatively coupled to either a single memory (as shown in FIG. 5) or a plurality of memories (not shown in FIG.s). Further, each processor 520A, 520B, . . . 520N may be communicatively coupled to the load balancer 220 and configured to receive a plurality of events as an event queue from the load balancer, as shown in FIG. 5. Moreover, each processor 520A, 520B, . . . 520N may be communicatively coupled to the object storage 280 and configured to store objects created by the corresponding drainer unit in the processor, as illustrated in FIG. 5.

Figure 6:
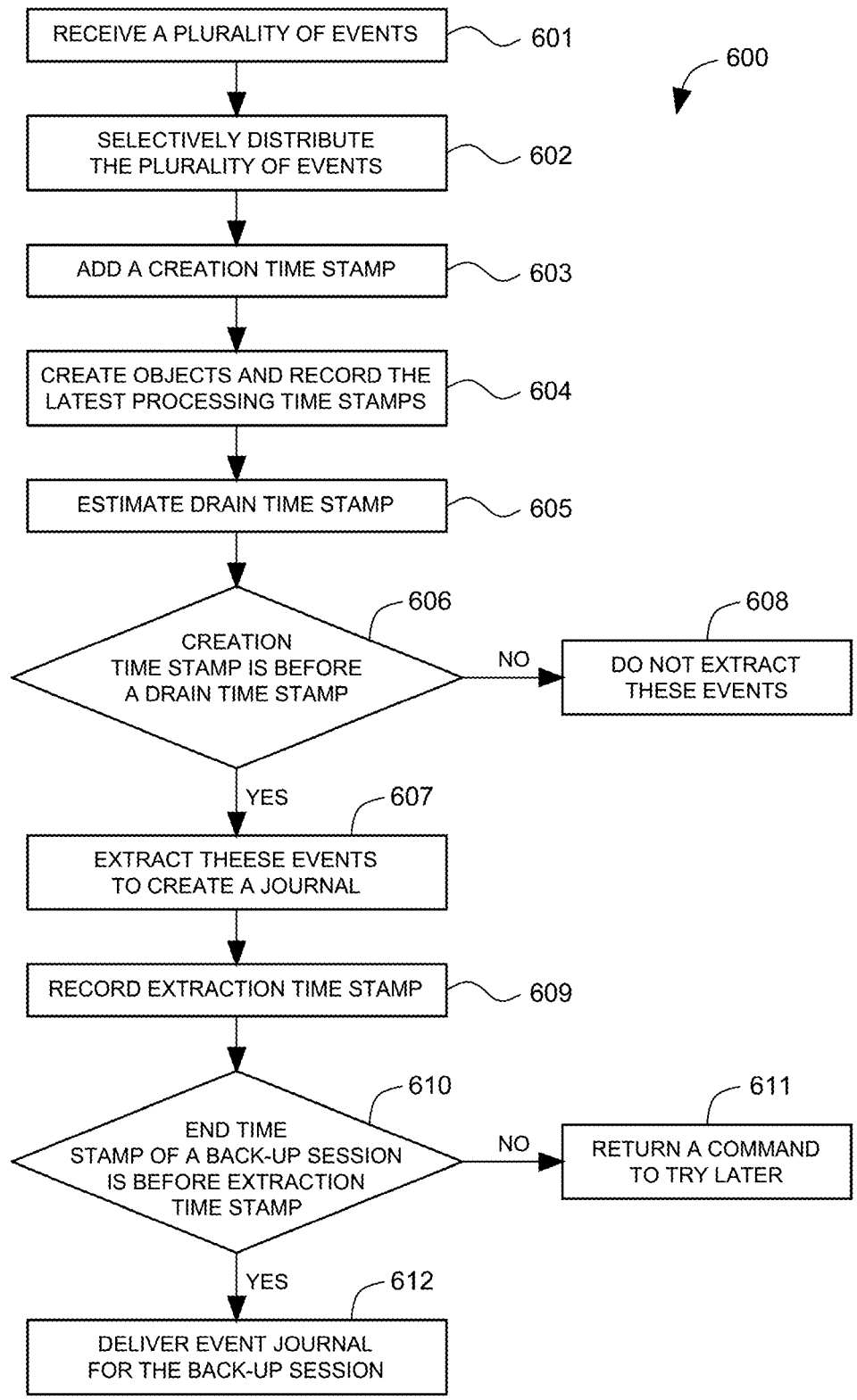
FIG. 6 is a flow chart illustrating a method for delivering an event journal, according to some aspects of the present description.

FIG. 6 is a flowchart illustrating a method 600 for delivering an event journal generated during a back-up session in a distributed file system. The method 600 may be implemented using the systems of FIGS. 2 and 5, according to some aspects of the present description. Each step of the method 600 is described in detail below.

At block 601, a plurality of events from a plurality of back-up sessions corresponding to a plurality of back-up data sets is received by the event intake module. At block 602, the plurality of events is selectively distributed across a plurality of object creation modules to create an event queue. As noted earlier, each object creation module of the plurality of object creation modules includes an ingestor unit and a drainer unit.

At block 603, a creation time-stamp (CTS) is added, by the corresponding ingestor units, to each event of the plurality of events being ingested. At block 604, the plurality of ingested events from the event queue is processed, by the corresponding drainer units, to create a plurality of objects that are stored in an object storage. Block 604 further includes recording the latest processing time-stamps (PTS) of the ingested events being stored in the object storage, by each of the active drainer units.

The method further includes, at block 605 reading a drain stamp (DTS) from the processed time-stamp (PTS). The drain time-stamp (DTS) is the smallest of the processing time-stamps (PTS) recorded by each of the active drainer units.

At block 606, the creation time-stamps (CTS) of the ingested events stored as objects are compared with the drain time-stamp. The ingested events, for which the creation time-stamp (CTS) is before the drain time-stamp (DTS) are extracted from the plurality of objects, at block 607. Block 607 further includes processing the extracted objects to create an event journal for each back-up set of the plurality of back-up sets. The ingested events, for which the creation time-stamp (CTS) is after the drain time-stamp (DTS) are not extracted from the plurality of objects, at block 608. At block 609, an extraction time-stamp (ETS) is recorded as a last-processed drain time-stamp (DTS).

The method 600 further includes, at block 610, receiving a query regarding a particular back-up session of a particular back-up data set, and comparing an end time-stamp of the back-up session in the query with the recorded extraction time-stamp (ETS). Block 611 includes delivery an event journal in response to the query if the end time-stamp is before the extraction time-stamp (ETS). Block 612 includes returning a command to try later, in response to the query, if the end time-stamp of the particular back-up session is after the extraction time-stamp (ETS).

The systems and methods described herein may be partially or fully implemented by a special purpose computer system created by configuring a general-purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium, such that when run on a computing device, cause the computing device to perform any one of the aforementioned methods. The medium also includes, alone or in combination with the program instructions, data files, data structures, and the like. Non-limiting examples of the non-transitory computer-readable medium include, but are not limited to, rewriteable non-volatile memory devices (including, for example, flash memory devices, erasable programmable read-only memory devices, or a mask read-only memory devices), volatile memory devices (including, for example, static random access memory devices or a dynamic random access memory devices), magnetic storage media (including, for example, an analog or digital magnetic tape or a hard disk drive), and optical storage media (including, for example, a CD, a DVD, or a Blu-ray Disc). Examples of the media with a built-in rewriteable non-volatile memory, include but are not limited to memory cards, and media with a built-in ROM, including but not limited to ROM cassettes, etc. Program instructions include both machine codes, such as produced by a compiler, and higher-level codes that may be executed by the computer using an interpreter. The described hardware devices may be configured to execute one or more software modules to perform the operations of the above-described example embodiments of the description, or vice versa.

Non-limiting examples of computing devices include a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to the execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Figure 7:
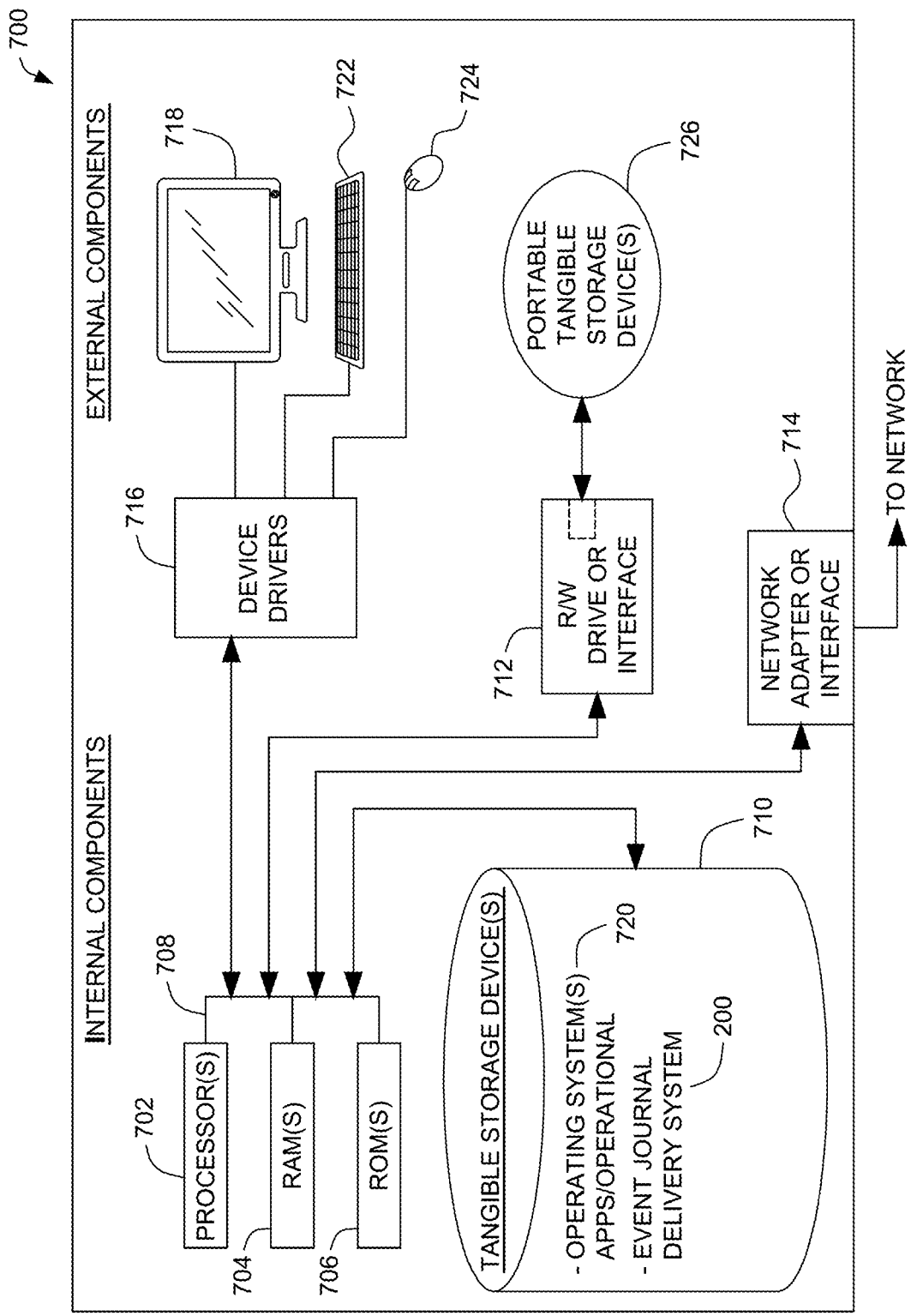
FIG. 7 is a block diagram illustrating an example computer system, according to some aspects of the present description.

One example of a computing system 700 is described below in FIG. 7. The computing system 700 includes one or more processor 702, one or more computer-readable RAMs 704 and one or more computer-readable ROMs 706 on one or more buses 708. Further, the computer system 708 includes a tangible storage device 710 that may be used to execute operating systems 720 and the event journal delivery system 200. Both, the operating system 720 and event journal delivery system 200 are executed by processor 702 via one or more respective RAMs 704 (which typically includes cache memory). The execution of the operating system 720 and/or the system 100 by the processor 702, configures the processor 702 as a special-purpose processor configured to carry out the functionalities of the operation system 720 and/or the event journal delivery system 200, as described above.

Examples of storage devices 710 include semiconductor storage devices such as ROM 506, EPROM, flash memory or any other computer-readable tangible storage device that may store a computer program and digital information.

Computer system 700 also includes a R/W drive or interface 712 to read from and write to one or more portable computer-readable tangible storage devices 726 such as a CD-ROM, DVD, memory stick or semiconductor storage device. Further, network adapters or interfaces 714 such as a TCP/IP adapter cards, wireless Wi-Fi interface cards, or 3G or 4G wireless interface cards or other wired or wireless communication links are also included in the computer system 700.

In one example embodiment, the event journal delivery system 200 may be stored in tangible storage device 710 and may be downloaded from an external computer via a network (for example, the Internet, a local area network or another wide area network) and network adapter or interface 714.

Computer system 700 further includes device drivers 716 to interface with input and output devices. The input and output devices may include a computer display monitor 718, a keyboard 722, a keypad, a touch screen, a computer mouse 724, and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

While only certain features of several embodiments have been illustrated and described herein, many modifications and changes will occur to those skilled in the art. It is, therefore, to be understood that the appended claims are intended to cover all such modifications and changes as fall within the scope of the invention and the appended claims.

We claim:

1. A system for delivering an event journal, the system comprising:
   an event intake unit configured to receive a plurality of backup datasets comprising a plurality of events corresponding to a plurality of sessions, wherein at least one of the backup datasets is received from a first node of a distributed file system and at least one set of the backup datasets is received from a second node of a distributed file system;
   a load balancer configured to distribute the plurality of events to create at least one event queue comprising distributed events, each event queue corresponding to each backup dataset received by the event intake unit;
   a plurality of object creation units configured to:
      ingest at least one event queue;
      generate a creation time-stamp indicating ingestion of each distributed event and a drainage time-stamp indicating storage of each distributed event; and
      record, for each event queue, the creation time-stamp and the drainage time-stamp;
   a journal manager configured to:
      generate, for each queue, an earliest recorded drainage time-stamp for a distributed event that is earliest in time, and a latest recorded drainage time-stamp for a distributed event that is latest in time;
adjust the latest drainage time-stamp for a jitter time;
create an event journal entry for event queues comprising the creation time-stamp before the earliest recorded drainage time-stamp;
record an extraction time-stamp for the latest recorded drainage time-stamp for each event queue; and
extract distributed events for which the creation time-stamp is before the drain time-stamp; and
a journal service unit configured to deliver the event journal to a client device in response to a query, if a backup session is terminated before the extraction time-stamp is recorded.

2. The system of claim 1, wherein the journal service unit is further configured to return a command to try later, in response to the query from the client device to deliver the event journal, if a backup session is terminated after the extraction time-stamp.

3. The system of claim 1, wherein each distributed event is assigned a unique sequence number.

4. The system of claim 1, wherein each of the plurality of object creation units further, includes a first creation unit and a second creation unit, the second creation unit configured to process distributed events assigned to the first creation unit to create a plurality of objects to be stored, if the first creation unit shuts down.

5. The system of claim 1, wherein the query corresponds to a metadata search, a compliance-related data search, a data anomaly detection search, a storage-analytics related search, a data-mining related search, or combinations thereof.

6. The system of claim 1, wherein the plurality of backup datasets include a first backup dataset corresponding to a first session received from the first node of the distributed file system, and a second backup dataset corresponding to a second session received from the second node of the distributed file system.

7. The system of claim 1, wherein a first event queue includes a first earliest recorded drainage time-stamp, and a latest recorded drainage time-stamp, the first event queue corresponding to the first session.

8. The system of claim 1, wherein a second event queue includes a first earliest recorded drainage time-stamp, and a latest recorded drainage time-stamp, the second event queue corresponding to the second session.

9. The system of claim 3, wherein the journal service unit is further configured to sort, in a time-based ordering, the extracted distributed events based on respectively assigned sequence numbers, before delivery of the event journal.

10. A system for delivering an event journal, the system comprising:
a memory storing one or more processor-executable routines; and
a processor communicatively coupled to the memory, the processor configured to:
receive a plurality of backup datasets, comprising a plurality of events corresponding to plurality of sessions, wherein at least one of the backup datasets is received from a first node of a distributed file system and at least one set of the backup datasets is received from a second node;
a load balance configured to distribute the plurality events to create at least one event queue comprising distributed events, each event queue corresponding to each backup dataset received by an event intake unit;
a plurality of object creation units configured to:
ingest at least one event queue;
generate a creation time-stamp indicating ingestion of each distributed event and a drainage time-stamp indicating storage of each distributed event;
record, for each distributed event the creation time-stamp and the drainage time-stamp;
a journal manager configured to:
generate, for each event queue, an earliest recorded drainage time-stamp for a distributed event that is earliest in time, and a latest recorded drainage time-stamp for a distributed event that is latest in time;
adjust the latest drainage time-stamp for a jitter time;
create an event journal entry for event queues comprising the creation time-stamp before an earliest drain time-stamp;
record an extraction time-stamp for the latest recorded drainage time-stamp for each event queue; and
extract distributed events for which the creation time-stamp is before the drain time-stamp; and
a journal service unit configured to deliver the event journal to a client device in response to a query if a backup session is terminated before the extraction time-stamp is recorded.

11. The system of claim 10, wherein the processor is further configured to return a command to try later, in response to the query from the client device to deliver the event journal, if a backup session is terminated after the extraction time-stamp.

12. The system of claim 10, wherein each distributed event is assigned a unique sequence number.

13. The system of claim 10, wherein each of the plurality of object creation units further, includes a first creation unit and a second creation unit, the second creation unit configured to process distributed events assigned to the first creation unit, to create a plurality of objects to be stored, if the first creation unit shuts down.

14. The system of claim 10, wherein the query corresponds to a metadata search, a compliance-related data search, a data anomaly detection search, a storage-analytics related search, a data-mining related search, or combinations thereof.

15. The system of claim 12, wherein the processor is further configured to sort, in a time-based ordering, the extracted distributed events based on respectively assigned sequence numbers, before delivery of the event journal.

16. A method for delivering an event journal, the method comprising:
receiving a plurality of backup datasets comprising a plurality of events corresponding to a plurality of session, wherein at least one of the backup datasets is received from a first node of a distributed filed system and at least one set of the backup datasets is received from a second node;
selectively distributing the plurality of events to create at least one event queue comprising distributed events, each event queue corresponding to each backup dataset received by an event intake unit;
ingesting at least one event queue;
generating a creation time-stamp indicating ingestion of each distributed event;
generating a drainage time-stamp indicating storage of each distributed event;
recording, for each event queue the creation time-stamp and drainage time-stamp;

generating, for each queue, an earliest recorded drainage time-stamp for a distributed event that is earliest in time, and a latest recorded drainage time stamp for a distributed event that is latest in time;

adjusting the latest drainage time-stamp for a jitter time;

creating an event journal entry for event queues comprising the creation time-stamp before an earliest drain time-stamp;

record an extraction time-stamp for the latest recorded drainage time-stamp for each event queue;

extracting distributed events for which the creation time-stamp is before the drain time-stamp; and delivering the event journal to a client device in response to a query, if a backup session is terminated before the extraction time-stamp is recorded.

17. The method of claim 16, further comprising returning a command to try later, in response to the query from the client device to deliver the event journal, if a backup session is terminated after the extraction time-stamp.

18. The method of claim 16, wherein each distributed event is assigned a unique sequence number.

19. The method of claim 16, wherein the query corresponds to a metadata search, a compliance-related data search, a data anomaly detection search, a storage-analytics related search, a data-mining related search, or combinations thereof.

20. The method of claim 18, further comprising sorting, in a time-based ordering, the extracted distributed events based on respectively assigned sequence numbers, before delivery of the event journal.

* * * * *